United States Patent
Sugiura et al.

(10) Patent No.: US 10,322,536 B2
(45) Date of Patent: Jun. 18, 2019

(54) INJECTION MOLDING MACHINE

(71) Applicant: FANUC CORPORATION, Yamanashi (JP)

(72) Inventors: Fuyuki Sugiura, Yamanashi (JP); Koichi Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/952,051

(22) Filed: Apr. 12, 2018

(65) Prior Publication Data

US 2018/0333906 A1    Nov. 22, 2018

(30) Foreign Application Priority Data

May 17, 2017    (JP) .................................. 2017-097895

(51) Int. Cl.
| | |
|---|---|
| *B29C 45/17* | (2006.01) |
| *B29C 45/76* | (2006.01) |
| *G01S 17/08* | (2006.01) |
| *G01S 17/88* | (2006.01) |
| *G01S 17/87* | (2006.01) |
| *B29C 45/04* | (2006.01) |

(52) U.S. Cl.
CPC .......... *B29C 45/1761* (2013.01); *B29C 45/76* (2013.01); *G01S 17/08* (2013.01); *G01S 17/875* (2013.01); *G01S 17/88* (2013.01); *B29C 45/0408* (2013.01); *B29C 2045/1765* (2013.01); *B29C 2945/76096* (2013.01); *B29C 2945/76461* (2013.01)

(58) Field of Classification Search
CPC ................ B29C 45/1761; B29C 45/76; B29C 2045/1765; B29C 2945/76096; B29C 2945/76461; B29C 2945/76568
See application file for complete search history.

(56) References Cited

U.S. PATENT DOCUMENTS

| | | | |
|---|---|---|---|
| 3,103,701 A | * | 9/1963 | Calchera ................. B29C 45/03 100/264 |
| 7,140,872 B2 | * | 11/2006 | Nishimura .......... B29C 45/1761 425/589 |
| 9,149,963 B2 | * | 10/2015 | Urushizaki ......... B29C 45/1774 |

FOREIGN PATENT DOCUMENTS

| | | |
|---|---|---|
| JP | 2004-017231 A | 1/2004 |
| JP | 2014-051047 A | 3/2014 |
| JP | 2016-026892 A | 2/2016 |

OTHER PUBLICATIONS

An Office Action mailed by the Japanese Patent Office dated Dec. 11, 2018, which corresponds to Japanese Patent Application No. 2017-097895 and is related to U.S. Appl. No. 15/952,051.

* cited by examiner

*Primary Examiner* — James P Mackey
(74) *Attorney, Agent, or Firm* — Studebaker & Brackett PC

(57) ABSTRACT

An injection molding machine according to the present invention includes a base mounted on a mounting surface with a support interposed therebetween with a distance D1 and a distance D2 to the mounting surface, a plurality of measurement units attached to the base so as to measure distances respectively to the mounting surface, and a horizontal degree calculation unit for calculating a horizontal degree of the base on a basis of the distances measured by the plurality of measurement units.

4 Claims, 4 Drawing Sheets

INJECTION MOLDING MACHINE

This application is based on and claims the benefit of priority from Japanese Patent Application No. 2017-097895, filed on May 17, 2017, the content of which is incorporated herein by reference.

BACKGROUND OF THE INVENTION

Field of the Invention

The present invention relates to as injection molding machine.

Related Art

In a conventional injection molding machine, a horizontal degree of a base mounted on a mounting surface with a support interposed therebetween may change due to vibration when high-speed operation is performed or other case. For this reason, a horizontal degree of the base needs to be detected periodically. A method of disposing a level or the like on an upper surface of the base is generally adopted in order to detect a horizontal degree of the base.

Patent Document 1 discloses a method of disposing a position sensor or the like on a support in order to mount on the injection molding machine itself the function of detecting and adjusting a horizontal degree of the base. Patent Document 2 discloses a method of keeping a horizontal degree by sending a position command to a motor from an origin sensor mounted on a support via a servo amplifier.

Patent Document 1: Japanese Unexamined Patent Application, Publication No. 2016-026892

Patent Document 2: Japanese Unexamined Patent Application, Publication No. 2004-017231

SUMMARY OF THE INVENTION

However, such a method as described above requires a sensor or the like to be mounted in accordance with a shape or a position of the support or the like, thereby requiring a new sensor or the like in the case of replacing the support or the like. Accordingly, there is a demand for an injection molding machine capable of detecting a horizontal degree of a base by a method which is simple and low in operation cost.

The object of the present invention is to provide an injection molding machine capable of detecting a horizontal degree of a base by a method which is simple and low in operation cost.

(1) An injection molding machine (for example, an injection molding machine 1 described below) according to the present invention includes a base (for example, a base 3 described below) mounted on a mounting surface (for example, a mounting surface MS described below) with a support (for example, a mount 4 described below) interposed therebetween with a space (for example, a space D1 and a space D2 described below) to the mounting surface, a plurality of measurement units (for example, laser displacement meters 5a, 5b, 5c, 5d described below) attached to the base so as to measure distances respectively to the mounting surface, and a horizontal degree calculation unit (for example, a horizontal degree calculation unit 7 described below) for calculating a horizontal degree of the base on a basis of the distances measured by the plurality of measurement units.

(2) In the injection molding machine according to (1), the base may have a first base (for example, a first base 3a described below) mounted on the mounting surface with the support interposed therebetween with a first space (for example, a first space D1 described below) to the mounting surface, and a second base (for example, a second base 3b described below) mounted so as to protrude sideways from the first base with a second space (for example, a second space D2 described below) different from the first space to the mounting surface. The plurality of measurement units may include one or a plurality of first measurement units (for example, first laser displacement meters 5a, 5b described below) attached to the first base, and one or a plurality of second laser displacement meters (for example, second measurement units 5c, 5d described below) attached to the second base.

(3) In the injection molding machine according to (1) or (2), the base may be mounted so as to be able to vibrate with respect to the mounting surface.

(4) In the injection molding machine according to any one of (1) to (3), the base may have a hole (for example, a hole 8 described below) for attaching each of the measurement units.

The present invention is able to provide an injection molding machine capable of detecting a horizontal degree of a base by a method which is simple and low in operation cost.

DETAILED DESCRIPTION OF THE INVENTION

Figure 1:
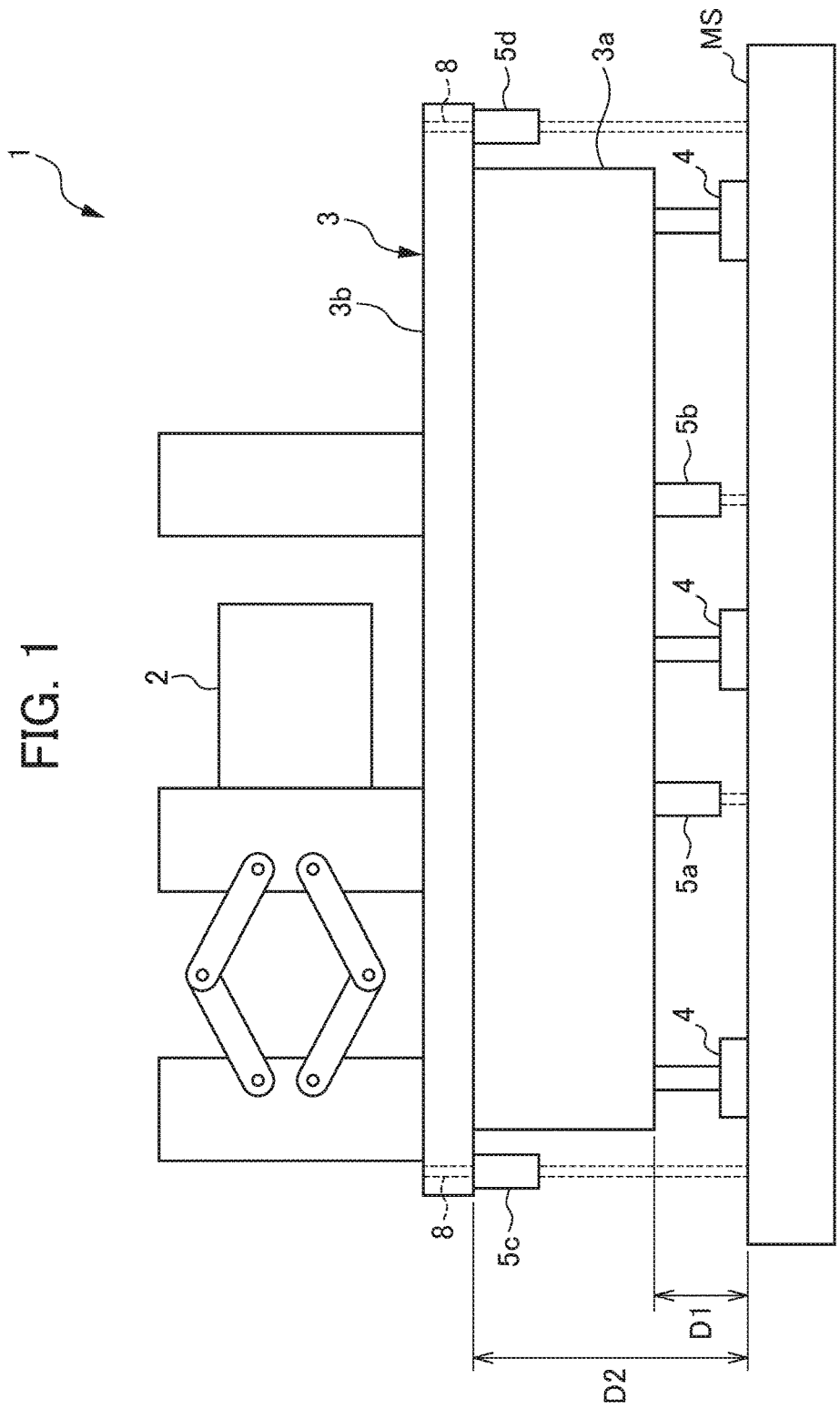
FIG. 1 is a schematic diagram of an injection molding machine according to an embodiment of the present invention.
Figure 2:
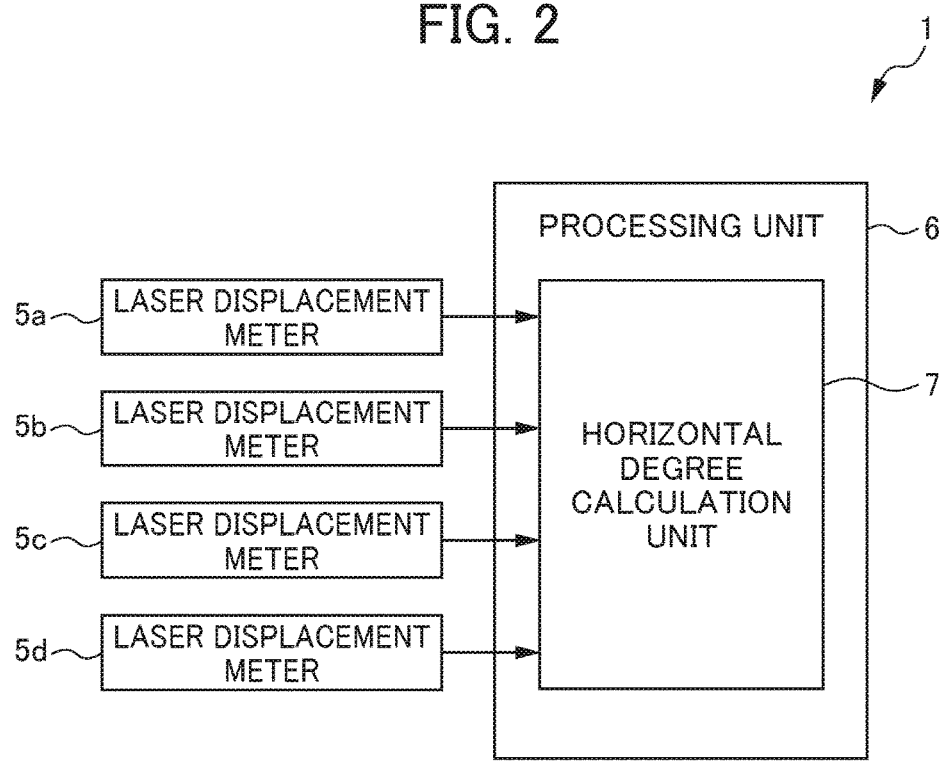
FIG. 2 is a block diagram illustrating a functional configuration of the injection molding machine.
Figure 3A:
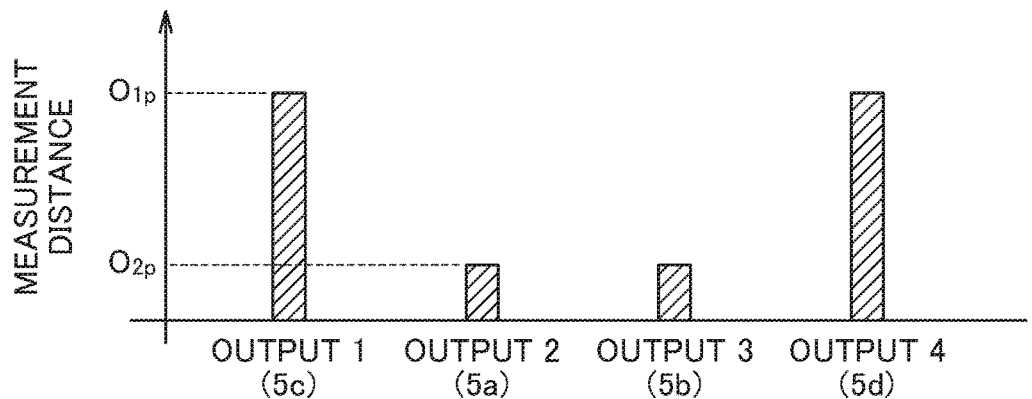
FIG. 3A is a bar graph indicating reference values of measurement distances by respective laser displacement meters.
Figure 3B:
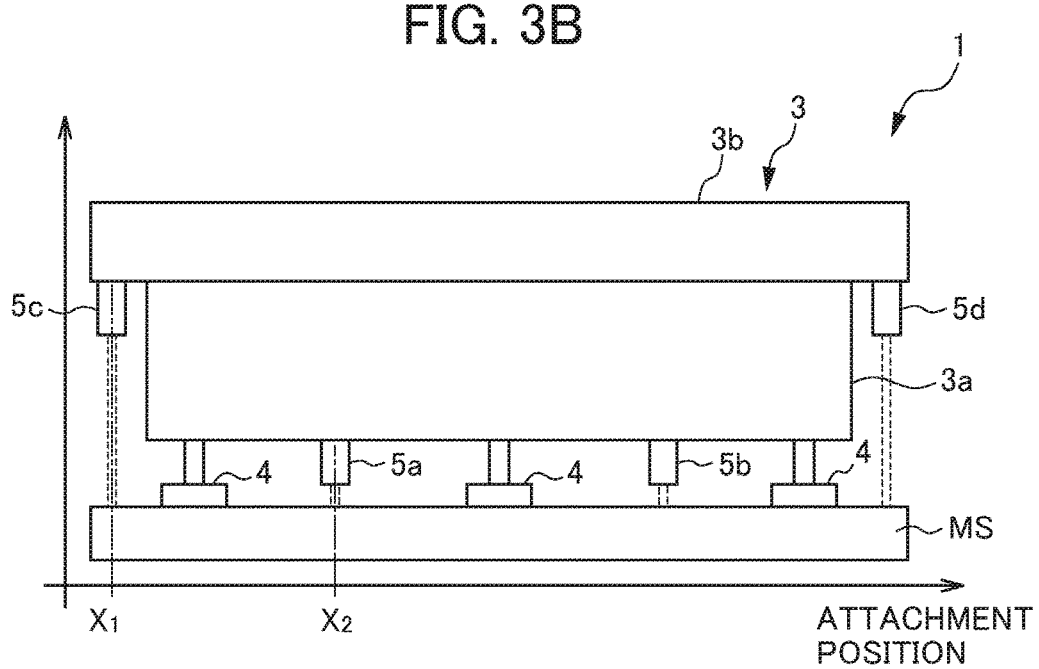
FIG. 3B is a schematic diagram illustrating the injection molding machine in a horizontal posture when the respective laser displacement meters detect the reference values.
Figure 4A:
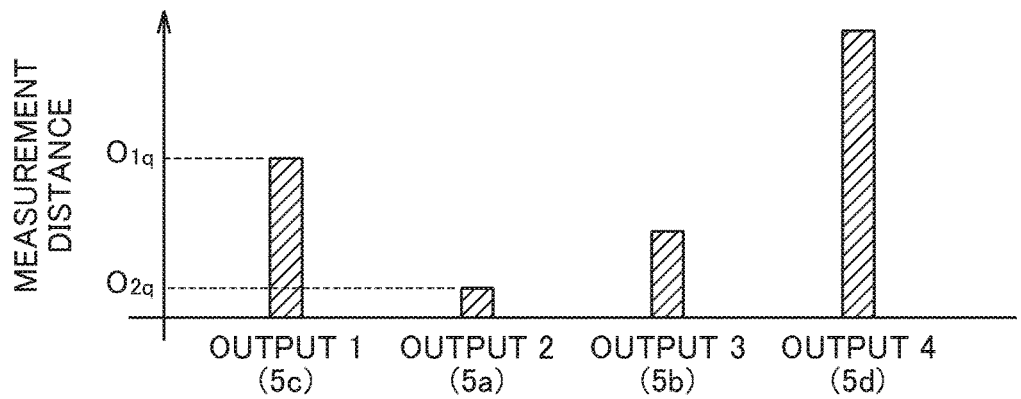
FIG. 4A is a bar graph indicating measurement distances by the respective laser displacement meters at the time of detecting a horizontal degree.
Figure 4B:
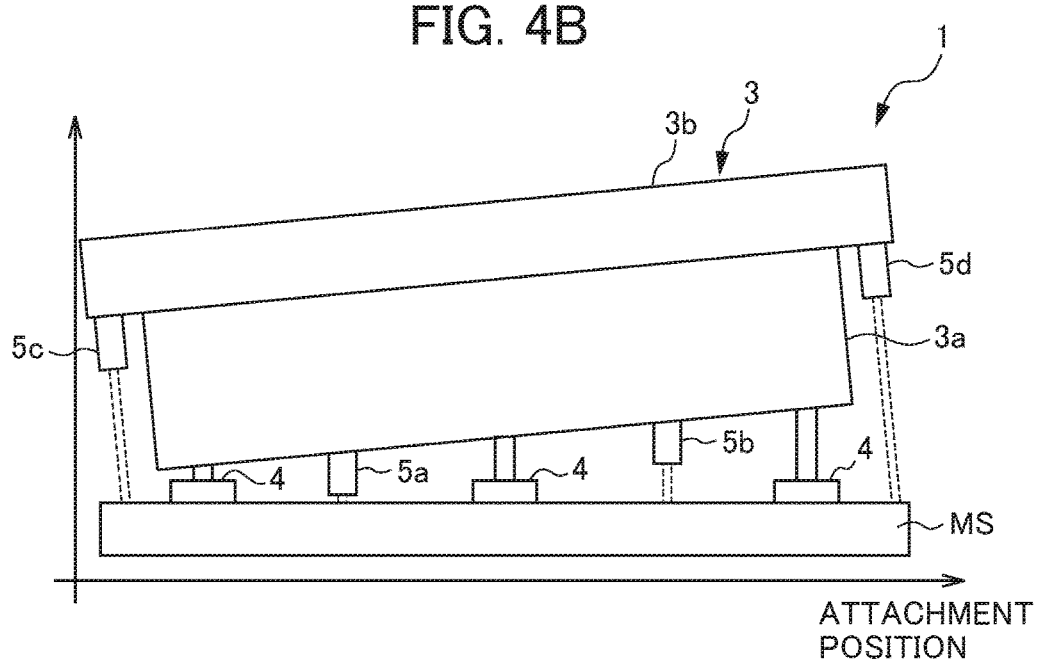
FIG. 4B is a schematic diagram illustrating the injection molding machine in an inclined posture at the time of detecting the horizontal degree.

An embodiment of the present invention will be described below in detail with reference to the drawings. FIG. 1 is a schematic diagram of an injection molding machine 1 according to the embodiment of the present invention. FIG. 2 is a block diagram illustrating a functional configuration of the injection molding machine 1. FIG. 3A is a bar graph indicating reference values of the measurement distances by respective laser displacement meters 5a to 5d. FIG. 3B is a schematic diagram illustrating the injection molding machine 1 in a horizontal posture when the respective laser displacement meters 5a to 5d detect the reference values. FIG. 4A is a bar graph indicating measurement distances by the respective laser displacement meters 5a to 5d at the time of detecting a horizontal degree. FIG. 4B is a schematic diagram illustrating the injection molding machine 1 in an inclined posture at the time of detecting the horizontal degree.

As shown in FIG. 1, the injection molding machine 1 according to the present embodiment performs molding by injecting molten resin into a mold 2 and clamping. More specifically, the injection molding machine 1 includes the mold 2, a base 3, a mount 4 (support), the plurality of laser displacement meters 5a, 5b, 5c, 5d (measurement units), and a processing unit 6 including a horizontal degree calculation unit 7 (refer to FIG. 2). The mold 2 is mounted above the base 3.

The base 3 is mounted with the mount 4 interposed therebetween on a mounting surface MS such as a metal plate so as to be able to vibrate with respect to the mounting surface MS, with a space D1 and a space D2 respectively to the mounting surface MS. More specifically, the base 3 has a first base 3a and a second base 3b. The first base 3a, which serves as a lower portion of the base 3, is mounted on the mounting surface MS with the mount 4 interposed therebetween with the first space D1 to the mounting surface MS. The second base 3b, which serves as an upper portion of the base 3, is mounted so as to protrude sideways from the first base 3a, with the second space D2 (>D1) to the mounting surface MS, which is different from the first space D1. The base 3 as described above has a hole 8 for attaching each of the laser displacement meters 5a to 5d. FIG. 1 shows only of the holes 8 corresponding to the laser displacement meters 5c and 5d.

The mount 4, which serves as a support interposed between the mounting surface MS and the base 3, has a shock absorbing property for absorbing shock generated when the mold 2 opens and closes at a high speed or when the mold 2 is filled with resin at a high speed.

Each of the plurality of laser displacement meters 5a to 5d functions as a measurement unit for measuring a distance between the base 3 and the mounting surface MS. Laser light emitted by each of the laser displacement meters 5a to 5d is illustrated by a broken line. More specifically, a plurality of first laser displacement meters 5a and 5b attached to the first base 3a out of the plurality of laser displacement meters 5a to 5d are attached on the bottom surface of the first base 3a, so as to function each as a first measurement unit for measuring a distance between the first base 3a and the mounting surface MS. A plurality of second laser displacement meters 5c and 5d attached to the second base 3b out of the plurality of laser displacement meters 5a to 5d are attached on the bottom surface of the second base 3b, so as to function each as a second measurement unit for measuring a distance between the second base 3b and the mounting surface MS. The distance measured by each of the laser displacement meters 5a to 5d is output at all times or at a predetermined timing, and then input to the horizontal degree calculation unit 7 (refer to FIG. 2) included as a part of the processing unit 6 (refer to FIG. 2).

As shown in FIG. 2, the processing unit 6 has the horizontal degree calculation unit 7. The horizontal degree calculation unit 7 calculates a horizontal degree of the base 3 (refer to FIG. 1) on the basis of the distances measured by the plurality of laser displacement meters 5a to 5d.

In the case where the injection molding machine 1 when installed or other time is kept in a horizontal posture as shown in FIG. 3B, the distances to the mounting surface MS respectively measured by the laser displacement meters 5a to 5d correspond to the reference values as shown in FIG. 3A. In the case where the injection molding machine 1 when detecting a horizontal degree is in an inclined posture as shown in FIG. 4B, the distances to the mounting surface MS respectively measured by the laser displacement meters 5a to 5d correspond to the measurement values as shown in FIG. 4A, which are different from the reference values (refer to FIG. 3A).

More specifically, the reference value of the output (output 2) by the laser displacement meter 5a is defined as $O_{2p}$; the reference value of the output (output 3) by the laser displacement meter 5b is defined as $O_{3p}$; the reference value of the output (output 1) by the laser displacement meter 5c is defined as $O_{1p}$; and the reference value of the output (output 4) by the laser displacement meter 5d is defined as $O_{4p}$.

The value of the output (output 2) by the laser displacement meter 5a at the time of detecting a horizontal degree is defined as $O_{2q}$; the value of the output (output 3) by the laser displacement meter 5b at the time of detecting a horizontal degree is defined as $O_{3q}$; the value of the output (output 1) by the laser displacement meter 5c at the time of detecting a horizontal degree is defined as $O_{1q}$; and the value of the output (output 4) by the laser displacement meter 5d at the time of detecting a horizontal degree is defined as $O_{4q}$.

The coordinate in the horizontal direction of the attachment position of the laser displacement meter 5a is defined as $X_2$; the coordinate in the horizontal direction of the attachment position of the laser displacement meter 5b is defined as $X_3$; the coordinate in the horizontal direction of the attachment position of the laser displacement meter 5c is defined as $X_1$; and the coordinate in the horizontal direction of the attachment position of the laser displacement meter 5d is defined as $X_4$.

In an example, in the case where the horizontal degree calculation unit 7 calculates a horizontal degree $L_{12}$ on the basis of the outputs by the laser displacement meters 5c, 5a, the horizontal degree $L_{12}$ is expressed as follows (Formula 1). The direction of the horizontal degree is determined by the coordinates $X_1$ and $X_2$.

$$L_{12}=[(O_{2q}-O_{1q})-(O_{2p}-O_{1p})]/(X_2-X_1) \qquad \text{(Formula 1)}$$

In an example, the horizontal degree obtained through the calculation by the horizontal degree calculation unit 7 is displayed on an indicator (not shown), thereby informing a user of the horizontal degree.

In the injection molding machine 1, the mount 4 deteriorates due to aging by shock absorption of vibration generated by the injection molding machine, and the mounting surface MS itself is deformed, whereby the horizontal degree of the base 3 may change in some cases. Accordingly, in the injection molding machine 1, the horizontal degree of the base 3 needs to be detected periodically. The horizontal degree of a conventional injection molding machine is checked by a level disposed on an upper surface of a base or a mechanism portion, and the injection molding machine needs to be stopped in order that the horizontal degree is checked. In the case of a compact injection molding machine, the injection molding machine needs to be moved to a predetermined position in order that a level is attached thereto, which causes a problem that the downtime of the injection molding machine is made longer. Furthermore, a method of attaching a sensor to a support requires one sensor for each support, thus resulting in requiring plural types of sensors.

The injection molding machine 1 according to the present embodiment includes the plurality of laser displacement meters 5a to 5d for measuring the distances between the base 3 and the mounting surface MS. Therefore, the horizontal degree of the base 3 is always detectable without the injection molding machine being stopped or being hindered in the operation, irrespective of the shape of the base 3 or the like. Accordingly, the horizontal degree of the base 3 is detectable by a method which is simple and low in operation cost.

According to the present embodiment, since the direction of the horizontal degree is enabled to be variably measured on the basis of the positional relations among the laser displacement meters 5a to 5d, setting of the laser displacement meters 5a to 5d in more variously different positional relations enables to detect the horizontal degree in more directions.

According to the present embodiment, the base 3 has the plurality of holes 8 provided in advance, thereby enabling to easily attach the laser displacement meters 5a to 5d or change the positions thereof.

Although the embodiment of the present invention has been described above, the present invention is not limited to the embodiment described above. The effects described in the present embodiment are listed merely as the most preferable effects produced by the present invention, and the effects produced by the present invention are not limited to those described in the present embodiment.

Although the plurality of first laser displacement meters 5a, 5b are attached to the first base 3a in the above embodiment, the present invention is not limited to this. Alternatively, only one of the first laser displacement meters may be attached to the first base 3a. Although the plurality of second laser displacement meters 5c, 5d are attached to the second base 3b, the present invention is not limited to this. Alternatively, only one of the second laser displacement meters may be attached to the second base 3b.

Although the laser displacement meters 5a to 5d serve as the measurement units in the above-described embodiment, the present invention is not limited to this. Alternatively, a dial gauge may serve as the measurement unit.

EXPLANATION OF REFERENCE NUMERALS

1 INJECTION MOLDING MACHINE
2 MOLD
3 BASE
3a FIRST BASE
3b SECOND BASE
4 MOUNT (SUPPORT)
5a, 5b FIRST LASER DISPLACEMENT METER (LASER DISPLACEMENT METER, MEASUREMENT UNIT, FIRST MEASUREMENT UNIT)
5c, 5d SECOND LASER DISPLACEMENT METER (LASER DISPLACEMENT METER, MEASUREMENT UNIT, SECOND MEASUREMENT UNIT)
6 PROCESSING UNIT
7 HORIZONTAL DEGREE CALCULATION UNIT (HORIZONTAL DEGREE CALCULATION UNIT)
MS MOUNTING SURFACE
D1 FIRST SPACE (SPACE)
D2 SECOND SPACE (SPACE)

What is claimed is:

1. An injection molding machine comprising:
a base mounted on a mounting surface with a support interposed therebetween with a space to the mounting surface;
a plurality of measurement units attached to the base so as to measure distances respectively to the mounting surface; and
a horizontal degree calculation unit for calculating a horizontal degree of the base on a basis of the distances measured by the plurality of measurement units.

2. The injection molding machine according to claim 1, wherein the base includes:
a first base mounted on the mounting surface with the support interposed therebetween with a first space to the mounting surface; and
a second base mounted so as to protrude sideways from the first base with a second space to the mounting surface, the second space being different from the first space, and wherein the plurality of measurement units include:
one or a plurality of first measurement units attached to the first base, and
one or a plurality of second measurement units attached to the second base.

3. The injection molding machine according to claim 1, wherein the base is mounted so as to be able to vibrate with respect to the mounting surface.

4. The injection molding machine according to claim 1, wherein the base has a hole for attaching each of the measurement units.

* * * * *